United States Patent

[11] 3,612,659

[72] Inventor Robert L. Forward
 Oxnard, Calif.
[21] Appl. No. 831,533
[22] Filed June 9, 1969
[45] Patented Oct. 12, 1971
[73] Assignee Hughes Aircraft Company
 Culver City, Calif.

[54] PASSIVE BEAM-DEFLECTING APPARATUS
 14 Claims, 4 Drawing Figs.
[52] U.S. Cl. ..................................................... 350/162 R,
 350/168
[51] Int. Cl. ..................................................... G02b 5/18
[50] Field of Search ......................................... 350/162,
 161, 163, 168, 285; 356/4, 5

[56] References Cited
 UNITED STATES PATENTS
 3,493,288 2/1970 Kaufman et al ............... 350/163
 3,485,559 12/1969 De Maria ....................... 350/162 UX FOREIGN PATENTS
1,088,838 10/1967 Great Britain ................ 350/162
 OTHER REFERENCES
 Hoffman " Optical Information Storage in Three-Dimensional Media Using the Lippman Technique" Applied Optics Vol. 7, No. 10, Oct. 1968, pp. 1949– 1954. 350– 162.

*Primary Examiner*—John K. Corbin
*Attorneys*—James K. Haskell and Richard J. Rengel ABSTRACT: A passive beam deflector for deflecting a beam of electromagnetic energy wherein a frequency adjustable electromagnetic beam source produces a beam of energy directed at and impinging upon a Bragg scanning volume having sets of pluralities of frequency discriminating spaced parallel scattering planes oriented orthogonally to the bisector of the incident and deflected beams, whereby the beam will be deflected in a different predetermined direction depending upon the frequency of the energy.

PATENTED OCT 12 1971 3,612,659
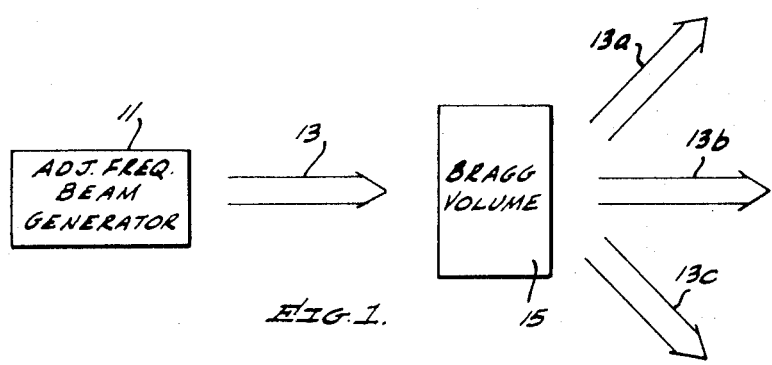
FIG. 1.
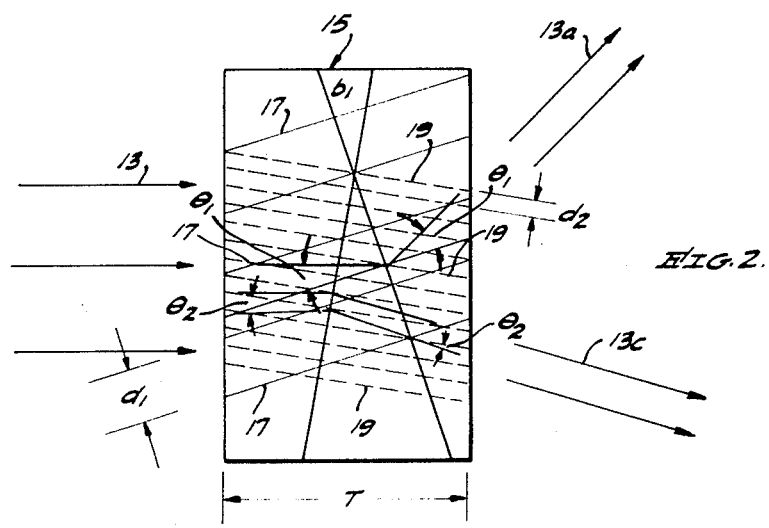
FIG. 2.
FIG. 4.
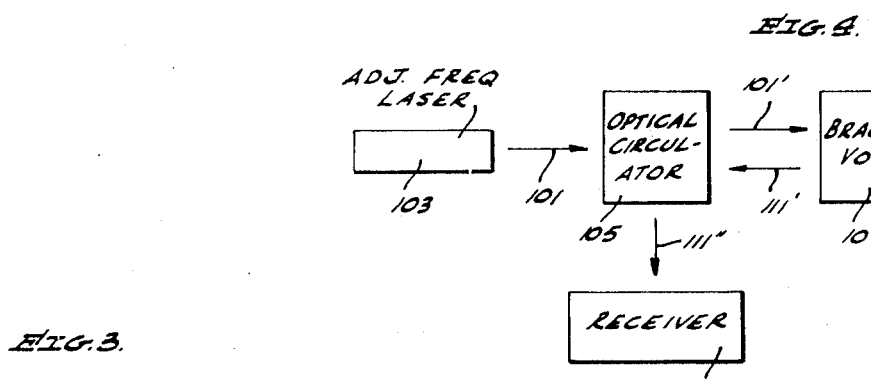
FIG. 3.
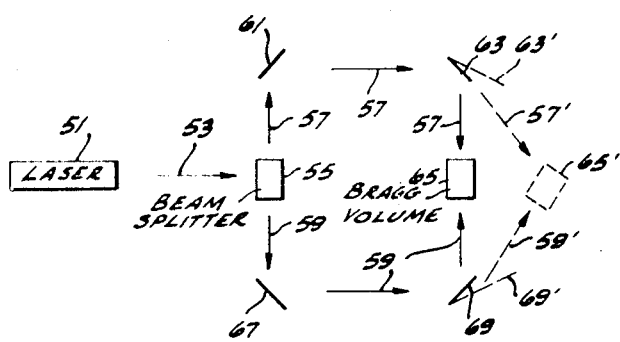
INVENTOR
ROBERT L. FORWARD,
BY
John Holbrichter Jr.
ATTORNEY.

3,612,659

PASSIVE BEAM-DEFLECTING APPARATUS

Beam-deflecting apparatus of the type to be described will find many applications, a few examples of which are (1) in dynamic display devices similar to television displays, (2) in controlling the direction of transmission or reception in laser radar or communication systems, and (3) in implementing automatic tracking of received laser beams.

With regard to the important field of optical beam steering, prior art devices such as modulators and deflectors were placed in the electromagnetic energy beam generated by a laser, for example, and means were provided to change the effective index of refraction gradients of these devices using the electro-optic effect or the acousto-optic effect. Still another technique used was the changing of the reflectance characteristics of the devices through modulation of surface reflectivity or mechanical scanning. These prior art schemes all had the disadvantage of being active devices requiring external signal and power inputs and thus were not very efficient. Also, in many cases, the speed of operation left much to be desired and the angle over which the beam could be scanned was undesirably limited. Further, prior devices such as frequency scanned diffraction gratings were only capable of two-dimensional operation.

From the foregoing, it should be obvious that a beam scanning technique that overcomes the disadvantages of the prior art and provides highly efficient and completely passive operation to speedily scan a beam over wide angles in all three dimensions would be a significant advancement in the art.

It is accordingly an object of the present invention to provide a simple and relatively inexpensive beam-deflecting apparatus.

It is another object of the invention to provide a completely passive beam deflection apparatus having high efficiency and fast operation.

It is still another object of the present invention to provide a beam-deflecting apparatus capable of volumetric scanning over wide angles.

The invention accomplishes the above aim by the use of a Bragg volume having recorded therein multiple sets of highly directional, highly wavelength dependent Bragg reflection planes to deflect the beam energy generated by a frequency adjustable electromagnetic beam generator such as a laser, for example. In accordance with one embodiment of the invention, a frequency adjustable laser is utilized for generating a collimated monochromatic beam of electromagnetic energy and a Bragg scanning volume is disposed in the path of the beam. The volume has sets of pluralities of scattering planes, each of which sets has a different characteristic spacing between the scattering planes, and where each of the sets has a nonparallel relationship with others of the sets. Further, each of the sets is oriented orthogonally with respect to the bisector of the incident and the corresponding deflected beams.

The invention and specific embodiments thereof will be described hereinafter by way of example and with reference to the accompanying drawings wherein like reference numerals denote like components or parts, and in which:

FIG. 1 is a schematic block diagram of apparatus for deflecting a collimated monochromatic beam of electromagnetic energy according to the present invention;

FIG. 2 is a schematic diagram of a frequency scanned Bragg reflection volume as seen in FIG. 1;

FIG. 3 is a block schematic diagram of a setup for providing a large number of Bragg reflection planes in a photosensitive Bragg volume using two laser beams; and FIG. 4 is a schematic block diagram of an optical radar system utilizing the beam deflecting apparatus of FIG. 1.

With reference now to the drawings and more particularly to FIG. 1, a beam-deflecting apparatus for deflecting a collimated monochromatic beam of electromagnetic energy includes an adjustable frequency beam generator 11 generating a collimated monochromatic beam 13. Also, a Bragg scanning volume 15 is disposed in the beam 13 to deflect the incident beam energy 13 in any desired frequency-dependent direction such as the upwardly deflected beam 13a, the horizontally propagating beam 13b, or the downwardly deflected beam 13c.

The Bragg scanning volume 15, as seen disposed in the path of the beam 13, is shown in more detail in FIG. 2. Briefly stated, the volume 15 includes sets of pluralities of scattering planes such as, for example, a first set of planes shown as solid lines 17 and a second set of planes shown as dashed lines 19. The Bragg volume 15 is placed in the path of the incident beam 13, which beam makes an angle $\theta_1$ with the planes 17 and $\theta_2$ with the planes 19. The incident light, once striking the reflection plane, is reflected at the same angle with respect to the plane as the angle of incidence. For example, the incident beam 13 is reflected an an angle $\theta_1$ by the planes 17 to produce the reflected beam 13a, and the energy reflected from the planes 19 is reflected at an angle $\theta_2$ to produce the deflected beam 13c.

The directional and frequency selectivity characteristics of the Bragg volume 15 can be derived by noting that if a wave 13 is incident at the Bragg angle $\theta$ on the reflecting planes 17, for example, having a plane separation distance $d_1$, where the volume has a thickness T, the beam 13a reflected off the $m^{th}$ plane is $m\lambda$ longer than the beam reflected off the zeroth plane. If the incoming plane wave is not at the Bragg angle $\theta$ but is at either of the extinction angles ($\theta' = \theta + \Delta\theta/2$ or $\theta'' = \theta - \Delta\theta/2$), then the beam reflected off the $m^{th}$ plane is $(m \pm 1)\lambda$ longer than the beam reflected off the zeroth plane. More importantly, the beam reflected off the $m^{th}$ plane is shifted $(m/2 \pm \frac{1}{2})\lambda$ and the half integral wavelength shift causes the $m/2$ beam to cancel out the zeroth beam. In addition, the $m/2 + 1$ plane is shifted $(m/2 + 1/m + \frac{1}{2})\lambda$, just cancelling the beam from the first plane which is shifted $(1 + 1/m)\lambda$. In a similar fashion, each beam reflected from a plane numbered from $m/2$ to $m$ cancels out a beam from one of the planes numbered 0 to $m/2$.

The calculation of the directional selectivity $\Delta\theta$ from the foregoing considerations can be expressed by $\Delta\theta = \lambda/T\sin\theta$ for $\Delta\theta$ small but not a small $\theta$. Using a similar approach, the frequency selectivity may be obtained by using the relationship $$\Delta\lambda = \frac{\lambda^2}{T \tan\theta \sin\theta}.$$

As an example of a typical Bragg volume having T=1 mm. and $\theta \approx 45°$, then $\Delta\theta \approx 0.027° \approx 5\times10^{14}$ radians, and for scan angles of ±0.5 radians, up to 2,000 separate directions can be stored in the volume. The most important parameter relevant to the present invention is the frequency selectivity and if it is assumed that $\theta \approx 45°$, then $\lambda = 5,000 A. \pm 1,000 A.$, and the frequency selectivity and number of beams available in a frequency scan beam deflector according to the invention are set forth in the following table:

| T | $\Delta\lambda$(A.) | Number of Separate Beams |
|---|---|---|
| 1 mm. | 3.5 | 570 (25 × 25) |
| 1 cm. | 0.35 | 5,700 (75 × 75) |
| 10 cm. | 0.035 | 57,000 (250 × 250) |

As a review of classic Bragg conditions and uses, reference can be made to any text on optics including, for example, "Introduction to Fourier Optics" by J. W. Goodman, published by McGraw-Hill, New York, 1968.

From the foregoing, it can be seen that the basic concept of the invention utilizes the Bragg reflection that occurs when light of wavelength $\lambda$ is incident on a set or sets of scattering planes with a separation $d$ oriented at an angle $\theta$ with respect to the beam. The angle of maximum reflection $\theta$ is given by the relation $\sin\theta = n\lambda/2d$, where $n$ is and integer.

It has recently been found in volumetric holographic information storage systems, many sets of Bragg reflecting planes can be set up in a volume of photosensitive material using various combinations of object beam and reference beam orientations and colors. Since the Bragg reflection process is highly wavelength and angle dependent, many images can be stored in the emulsion volume, each separated from the other on readout through color and/or direction. The disclosed invention utilizes this demonstrated ability of photosensitive volume such as silver halide emulsions, photochromics, and photopolymers to record multiple sets of highly directional, highly wavelength dependent Bragg reflection planes as an electromagnetic beam deflector.

With reference to FIG. 3, the Bragg volume 15 may be fabricated from photosensitive materials of the type described above by setting up a large number of Bragg reflection planes using two laser beams in a setup where the reflective orientation of the two beams and the photosensitive volume are varied as indicated by the arrangement shown in the figure. Here, a single frequency laser 51 projects a laser beam 53 at a beam splitter 55 to provide an upper beam 57 and a lower beam 59. The upper beam 57 is first reflected by a mirror 61 to an adjustable mirror 63 where it is directed at a photosensitive volume 65. At the same time, the lower beam 59 is reflected by a fixed mirror 67 toward an adjustable mirror 69 which in turn reflects the beam 59 at the volume 65. In this arrangement, the upper beam 57 and the lower beam 59 impinge upon the volume 65 from directly opposite directions and will produce parallel Bragg scattering planes having the smallest possible spacing $d$, all being oriented in a fixed relationship in the volume 65. In order to obtain a greater spacing distance $d$, and thus a set of Bragg scattering planes responsive to a lower frequency, the volume 65 may be moved to a position as shown by the dashed outline 65'. It will be found that the further the volume is moved to the right from the original position, the greater the spacing $d$ and the lower the responsive frequency will be. The volume 65' is also shown oriented at a different angle in order to illustrate the manner in which the angle of deflection is changed. It should also be noted that the volume may be rotated, prior to exposure, in an axis to provide frequency sensitive three dimensional or volumetric deflection.

The preparation of the Bragg volume does not require the generation of various frequencies since the separation between the planes $d$ is controlled by the relative orientation of the two beams with respect to the volume and the orientation of the planes in the photosensitive material is controlled by the orientation of the volume to the axis between the two laser beams. Thus, an optimum laser frequency can be used for the preparation of the Bragg volume.

In operation, the volume 15 is placed in front of the frequency adjustable laser beam 13, and if a set of Bragg scattering planes has been set up in the volume which satisfies the Bragg relation in separation distance $d$ and orientation $\theta$ for a given wavelength $\lambda$, then there will be a strong (up to 100 percent) scattering of the incident laser beam 13 in the direction $2\theta$ as seen in FIG. 2. A simplified example for two colors being generated by the laser 11 is shown in this figure. Thus, if the incident beam 13 has a long wavelength (red), then it preferentially reflects from the widely spaced planes 17 at the angle $\theta_1$, and if it has a short wavelength (blue), then it preferentially scatters from the closely spaced planes 19 oriented at the angle $\theta_2$.

An advantageous use of a beam-deflecting apparatus of the type described would be in an optical radar system as generally described in FIG. 4. Here, a laser beam 101 generated by an adjustable frequency laser 103 impinges upon an optical circulator 105 from which the beam 101' is propagated toward a Bragg volume 107 and deflected at an angle as indicated by the arrow 109, depending upon the frequency of the beam 101. After being reflected from a target (not shown), target return energy 111 (essentially returning from the direction of the outgoing energy) will be deflected by the Bragg volume 107 toward the optical circulator 105 as indicated by arrow 111' and will be directed by the circulator 105 in the form of beam 111" to a receiver 113. In this manner, by changing the frequency of the laser beam 101 as generated by the laser 103, a radar type energy beam may be directed in any desired direction as provided by the orientation of the Bragg scattering planes within the volume 107, and the same Bragg volume 107 will direct return energy from that same direction toward the circulator 105 to be detected and transformed into useful information by the receiver 113.

From the foregoing, it will be seen that the beam deflecting apparatus described is very simple in its fabrication and utilizes known materials and elements and therefore is economical to produce. Also, it has been shown that the apparatus is completely passive in operation and is therefore more efficient than the prior art active devices discussed previously.

In practicing this invention, any material may be employed exhibiting the characteristics described, examples being photochromics, photopolymers, and lithium niobate, all of which have demonstrated holographic resolution capabilities.

Although several specific embodiments of the invention have been herein illustrated, it will be appreciated that other organizations of the specific arrangements shown may be made within the spirit and scope of the invention. For example, collimated monochromatic electromagnetic beam energy may be generated by devices other than lasers and the frequency of operation of the apparatus need not be in the light spectrum. Thus, microwave energy may be used where the Bragg volume has Bragg reflecting or scattering planes separated by the distance $d$ responsive to that particular microwave energy.

Accordingly, it is intended that the foregoing disclosure and drawings shall be considered only a illustrations of the principles of this invention and are not to be construed in a limiting sense.

What is claimed is:

1. Passive beam deflecting apparatus for deflecting a collimated monochromatic beam of electromagnetic energy, comprising:
    means for generating a collimated monochromatic beam of electromagnetic energy including means for adjusting the frequency of said energy; and
    means disposed in the path of said beam responsive to said frequency adjustment for deflecting the beam to provide beam scanning as a function of the frequency adjustment, said latter means comprising a Bragg scanning volume having sets of pluralities of scattering planes, each of said sets having a characteristic spacing between said scattering planes, each of said sets having nonparallel relationships with others of said sets, and each of said sets being oriented orthogonally with respect to the bisector of the incident and the corresponding deflected beams.

2. Beam-deflecting apparatus according to claim 1, wherein said means for generating a collimated monochromatic beam of electromagnetic energy is a laser including said means for adjusting the frequency of energy generated therefrom.

3. Beam-deflecting apparatus according to claim 1, wherein said Bragg scanning volume is fabricated from photosensitive materials.

4. Beam-deflecting apparatus according to claim 2, further comprising a receiver sensitive to optical energy and optical circulator means disposed in the path of said beam between said laser and said Bragg volume for directing energy from said laser to said Bragg volume and energy from said Bragg volume to said receiver.

5. A passive beam deflection system arrangement for producing a scanning beam comprising in combinations:
    means for generating a collimated monochromatic energy beam of electromagnetic energy having a substantial cross-sectional area to provide a long-range collimated scanning beam of substantial energy, said means including means for varying the frequency of said energy over a predetermined frequency range;

a Bragg scanning volume disposed in the path of said beam, said volume having a corresponding substantial cross-sectional area and a substantial thickness for passing a substantial portion of said beam, said scanning volume being responsive to said beam to provide a scanning beam of substantial cross-sectional area and a large multiplicity of beams for scanning, said scanning volume comprising a large number of sets of pluralities of scattering planes, each of said sets having a characteristic spacing between said scattering planes.

6. The passive beam deflection system according to claim 5 in which said energy beam has a substantial cross-sectional area which provides for retaining a collimated scanning beam for long-range scanning.

7. The passive beam deflection system according to claim 5 in which the beam generator means and Bragg scanning volume are constructed and arranged whereby the incident beam is maintained at a constant angle corresponding to the Bragg angle substantially throughout the operation of said system.

8. The passive beam deflection system according to claim 5 in which the thickness of said scanning volume is a thickness T of at least approximately 1 millimeter to provide at least approximately 570 separate beams.

9. The passive beam deflection system according to claim 5 in which said thickness T is on the order of approximately 1 millimeter to 10 centimeters in thickness.

10. The passive beam deflection system according to claim 5 in which said scanning volume comprises photochromic material.

11. The passive beam deflection system according to claim 5 in which said scanning volume comprises a photopolymer material.

12. The passive beam deflection system according to claim 5 in which said scanning volume comprises lithium niobate.

13. The method of passively deflecting a collimated beam of electromagnetic energy to produce a long-range scanning beam comprising:

generating an incident collimated beam of electromagnetic energy having a substantial cross-sectional area to provide for maintaining collimated beams at said long-range;

disposing in the path of said beam, a Bragg scanning volume of corresponding cross-sectional area for passing at least a substantial portion of said incident beam, said scanning volume having sets of pluralities of scattering planes, each of said sets having nonparallel relationships with others of said sets, and each of said sets being oriented orthogonally with respect to the bisector of the incident and the corresponding deflected beams, so that said volume exhibits a frequency selective characteristic for different beam frequencies over a range of frequencies of said beam;

maintaining alignment of said beam and volume constant to produce a scanning beam substantially exclusively by frequency variations of said beam selectively deflected at different frequencies by individual ones of said sets of scattering planes;

varying the frequency of said beam over the range of frequency selective characteristics of the sets of scattering planes to provide selective reflection of said beam from different spaced sets of said scattering planes to produce frequency selective deflection of said beam from individual sets and scanning of said beam over the range of frequency selective characteristics of said sets of pluralities of scattering planes.

14. The method according to claim 13 in which said incident beam and deflected beam are of substantial cross-sectional area for producing an output scanning beam of substantial energy.